United States Patent
Suau et al.

(10) Patent No.: US 6,767,973 B2
(45) Date of Patent: Jul. 27, 2004

(54) USE OF WATER SOLUBLE POLYMERS AS DISPERSION AGENT OF AQUEOUS CALCIUM CARBONATE SUSPENSION, RESULTING AQUEOUS SUSPENSIONS AND THEIR USES

(75) Inventors: Jean-Marc Suau, Lucenay (FR); Christian Jacquemet, Lyons (FR); Jacques Mongoin, Quincieux (FR)

(73) Assignee: Coatex S.A.S., Genay (FR)

( * ) Notice: Subject to any disclaimer, the term of this patent is extended or adjusted under 35 U.S.C. 154(b) by 0 days.

(21) Appl. No.: 10/168,389

(22) PCT Filed: Dec. 20, 2000

(86) PCT No.: PCT/FR00/03613

§ 371 (c)(1),
(2), (4) Date: Jun. 21, 2002

(87) PCT Pub. No.: WO01/48093

PCT Pub. Date: Jul. 5, 2001

(65) Prior Publication Data

US 2003/0045647 A1 Mar. 6, 2003

(30) Foreign Application Priority Data

Dec. 27, 1999 (FR) .......................................... 99 16541

(51) Int. Cl.[7] ................................................. C08J 3/12
(52) U.S. Cl. ............................... 525/529.7; 525/330.2; 525/361; 525/362; 524/425; 524/556; 524/443; 524/559; 524/560; 526/317.1
(58) Field of Search .......................... 525/329.7, 330.2, 525/361, 362; 524/425, 556, 443, 559, 560, 543; 526/317.1

(56) References Cited

U.S. PATENT DOCUMENTS

| 4,868,228 A | * | 9/1989 | Gonnet et al. .............. 523/333 |
| 5,278,248 A | | 1/1994 | Egraz et al. |
| 5,736,601 A | * | 4/1998 | Egraz et al. ................ 524/425 |
| 5,880,085 A | | 3/1999 | Kensicher et al. |
| 6,140,376 A | * | 10/2000 | Golley et al. ................. 516/78 |

FOREIGN PATENT DOCUMENTS

EP 0 892 020 1/1999

* cited by examiner

*Primary Examiner*—David W. Wu
*Assistant Examiner*—Satya B Sastri
(74) *Attorney, Agent, or Firm*—Oblon, Spivak, McClelland, Maier & Neustadt, P.C.

(57) ABSTRACT

The invention relates to the use of homopolymers and/or water-soluble copolymers of acrylic acid with one or more acrylic, vinyl or allylic monomers as dispersing agents for aqueous suspensions of mineral particles issuing from a mechanical and/or thermal reconcentration step following upon a step of wet grinding without the use of a dispersant and at low concentration in terms of dry matter.

The invention also relates to the said aqueous suspensions and their uses in the fields of paper, paint, fillers for synthetic resins and rubbers, detergent and cleaning formulations, ceramics, drilling fluids, cements, plasters and other fields of application in civil engineering and the construction industry.

28 Claims, No Drawings

USE OF WATER SOLUBLE POLYMERS AS DISPERSION AGENT OF AQUEOUS CALCIUM CARBONATE SUSPENSION, RESULTING AQUEOUS SUSPENSIONS AND THEIR USES

The invention relates to the use of homopolymers and/or water-soluble copolymers of acrylic acid with one or more acrylic, vinyl or allylic monomers as dispersing agents for aqueous suspensions of calcium carbonate.

The invention also relates to the said aqueous suspensions of calcium carbonate and their uses in the fields of paper, like notably the manufacture or coating of paper, those of paint, fillers for synthetic resins and rubbers, detergent and cleaning formulations, and any other field using said suspensions such as notably ceramics, drilling fluids, cements, plasters and other fields of application in civil engineering and the construction industry.

For a long time already, persons skilled in the art have known about the use of grinding and/or dispersing agents for aqueous suspensions of mineral particles constituted by acrylic polymers and/or copolymers, of low molecular weight, totally or partially neutralized by various neutralizing agents (FR 2 603 042, EP 0 100 947, EP 0 127 388, EP 0 129 329 and EP 0 542 644).

Persons skilled in the art also know about the use of grinding and/or dispersing agents constituted by the fraction of acrylic polymers and/or copolymers whose specific viscosity is between 0.3 and 0.8 (patents FR 2 488 814, EP 0 100 948 and EP 0 542 643).

But these various types of grinding and/or dispersing agents of low molecular weight which make it possible to obtain aqueous suspensions of mineral particles refined and stable over time do not allow the putting back into suspension or redispersal in water of mineral particles, such as notably calcium carbonate, issuing from a mechanical and/or thermal reconcentration step following upon a step of wet grinding without the use of a dispersant and at low concentration in terms of dry matter. Such mineral particles, issuing from this mechanical and/or thermal reconcentration step following upon a step of wet grinding without the use of a dispersant, pose serious usage problems for persons skilled in the art who must disperse these mineral particles in the form of suspensions at very high concentration in terms of dry matter in order to be able to offer them to the user in a form which can be manipulated by said user.

Confronted with this problem, the Applicant then found, surprisingly, that the selection of homopolymers of acrylic acid and/or water-soluble copolymers of acrylic acid with one or more acrylic, vinyl or allylic monomers of a different and higher molecular weight than all the literature known to date teaches (and notably the patent application EP 0 850 685), makes it possible to put into aqueous suspension the mineral particles issuing from this mechanical and/or thermal reconcentration step following upon a step of wet grinding without the use of a dispersant and at low concentration in terms of dry matter.

By a step of wet grinding without the use of a dispersant, the applicant means a step of wet grinding without any dispersant but possibly with small quantities of flocculating agent up to 500 ppm.

Thus, one of the aims of the invention is the use of homopolymers of acrylic acid and/or water-soluble copolymers of acrylic acid with one or more acrylic, vinyl or allylic monomers of a molecular weight corresponding to a viscosity index with a value from 0.08 to 0.80, and preferentially from 0.20 to 0.60, as dispersing agents for aqueous suspensions of mineral particles issuing from a mechanical and/or thermal reconcentration step following upon a step of wet grinding without the use of a dispersant and at low concentration in terms of dry matter.

Similarly, another aim of the invention is to provide a dispersing agent for aqueous suspensions of mineral particles issuing from a mechanical and/or thermal reconcentration step following upon a step of wet grinding without the use of a dispersant and at low concentration in terms of dry matter.

An additional aim of the invention is to provide a method of putting said mineral particles into aqueous suspension using the selection of homopolymers of acrylic acid and/or water-soluble copolymers of acrylic acid with one or more acrylic, vinyl or allylic monomers of a molecular weight corresponding to a viscosity index with a value from 0.08 to 0.80, and preferentially from 0.20 to 0.60.

Another aim of the invention, besides those already mentioned, is to provide aqueous suspensions of refined mineral materials obtained by the aforementioned method, and characterised in that they contain from 0.1% to 2% by dry weight, and preferentially from 0.3% to 1.0% by dry weight, with respect to the dry weight of mineral material, of aqueous suspension dispersing agent according to the invention.

Finally, an additional aim of the invention concerns the use of these mineral aqueous suspensions in the fields of mass filling and coating of paper as well as those of paint, ceramics, drilling fluids, fillers for synthetic resins and rubbers, detergent and cleaning formulations, and any other field using said suspensions such as notably cements, plasters and other fields of application in civil engineering and the construction industry.

These aims are achieved by virtue of the use according to the invention of homopolymers of acrylic acid and/or water-soluble copolymers of acrylic acid with one or more acrylic, vinyl or allylic monomers of a molecular weight corresponding to a viscosity index with a value from 0.08 to 0.80, and preferentially from 0.20 to 0.60.

These homopolymers and/or copolymers result from the various known methods of radical polymerization using the polymerization initiators well known to persons skilled in the art such as, for example, hydroxylamine-based compounds or also using the polymerization initiators such as peroxides like notably hydrogen peroxide, tert-butyl hydroperoxide or the persalts like notably sodium persulphate, ammonium persulphate, potassium persulphate or analogues, or also sodium hypophosphite, hypophosphorous acid or again also phosphorous acid and/or their salts in the possible presence of metallic salts for example of iron or copper in a polymerization medium which can be water, methanol, ethanol, propanol, isopropanol, butanols, or their mixtures or also dimethylformamide, dimethylsulphoxide, tetrahydrofurane, acetone, methyl ethyl ketone, ethyl acetate, butyl acetate, hexane, heptane, benzene, toluene, xylene, and possibly in the presence of molecular mass controllers also referred to as chain transfer agents such as notably mercaptoethanol, thioglycolic acid and its esters, n-dodecyl mercaptan, acetic, tartaric, lactic, citric, gluconic or glucoheptonic acids, 2-mercaptopropionic acid, thiodiethanol, halogenated solvents like carbon tetrachloride, chloroform, methylene chloride, the ethers of monopropylene glycol, or their mixtures and analogues.

These homopolymers and/or copolymers used as dispersing agents according to the invention result from the various aforementioned methods of radical polymerization of one at least of the monomers chosen from among acrylic acid, methacrylic acid, itaconic acid, crotonic acid, fumaric acid, isocrotonic, aconitic, mesaconic, sinapic, undecylenic, angelic or canellic acid, and/or acrylamido methyl propane sulphonic acid in acid or partially neutralized form, or also from among acrylamide, methacrylamide, the esters of acrylic or methacrylic acids such as notably ethyl acrylate, butyl acrylate, methyl methacrylate, phosphate of acrylate or methacrylate of ethylene or propylene glycol or also again from among vinylpyrrolidone, vinylcaprolactame, isobutylene, diisobutylene, vinyl acetate, styrene, alphamethylstyrene, styrene sodium sulphonate vinylmethylether, or the allylics such as notably allylamine and its derivatives.

These homopolymers and/or copolymers used as dispersing agents according to the invention are partially or totally neutralized by one or more neutralizing agents having a monovalent function and possibly a polyvalent function.

The neutralizing agents having a monovalent function are chosen from the group constituted by the compounds containing alkaline cations, in particular sodium and potassium, or also lithium, ammonium, or again the aliphatic and/or cyclic primary or secondary amines such as for example the ethanolamines, mono and diethylamine or also cyclohexylamine.

The neutralizing agents having a polyvalent function are chosen from the group constituted by the compounds containing alkaline-earth divalent cations, in particular magnesium and calcium, or also zinc, and likewise by the trivalent cations, including in particular aluminium, or also by certain compounds containing higher-valency cations.

The homopolymers and/or copolymers designed to be used according to the invention as dispersing agents in water for mineral particles issuing from a mechanical and/or thermal reconcentration step following upon a step of wet grinding without the use of a dispersant and at low concentration in terms of dry matter are selected from among the homopolymers or copolymers having a molecular weight corresponding to a viscosity index with a value from 0.08 to 0.80, and preferentially from 0.20 to 0.60.

The molecular weight of the homopolymers or copolymers is measured on the form of the polymer salified with soda and according to the procedure described below and will be referred to as the viscosity index throughout the remainder of the present application.

To do this, the acid form of the compound whose viscosity index it is necessary to determine is 100% neutralized with soda and then diluted at 50 g/l in bipermutated water. This parent solution, which then has a concentration denoted $c_0$, is subjected to the following dilutions: $(2/3)c_0$, $(1/2)c_0$, $(1/3)c_0$, $(1/4)c_0$, $(1/6)c_0$, $(1/12)c_0$, $(1/18)c_0$, $(1/24)c_0$, $(1/36)c_0$.

The specific viscosity for each solution is then determined by means of a Schott AVS/500 viscometer equipped with an Ubbelohde tube of reference 53010/I and constant 0.01 and the specific viscosity curve is plotted as a function of the concentration.

The linear part of the curve makes it possible to obtain the viscosity index according to the equation Viscosity index=Limit of the specific viscosity when the concentration tends to zero.

The refined mineral substances to be put into suspension according to the invention are chosen from among the synthetic calcium carbonates or the natural calcium carbonates such as notably chalk, calcite, marble or also dolomite or their mixtures.

Thus, the use according to the invention of a selection of homopolymers of acrylic acid and/or water-soluble copolymers of acrylic acid with one or more acrylic, vinyl or allylic monomers and the development of a dispersing agent according to the invention permits the putting into suspension of mineral substances issuing from a mechanical and/or thermal reconcentration step following upon a step of wet grinding without the use of a dispersant and at low concentration in terms of dry matter and thus allows the obtaining of aqueous suspensions of refined mineral materials obtained by the aforementioned method and containing said dispersing agent according to the invention.

In practice, the operation of dispersing or putting into aqueous suspension of said mineral substances consists of adding, under agitation, the necessary amount of dispersing agent according to the invention so as to obtain an aqueous suspension of said mineral materials, issuing from a mechanical and/or thermal reconcentration step, having a concentration in terms of dry matter of at least 60% with a Brookfield viscosity strictly less than 2000 mPa.s measured at 100 rpm immediately after the putting into suspension and a Brookfield viscosity strictly less than 20,000 mPa.s, measured at 10 rpm after eight days' storage without agitation, that is to say so as to obtain an aqueous suspension of said mineral materials highly concentrated in terms of dry matter which remains able to be manipulated by the user even after a storage of a number of days and without agitation.

The scope and advantage of the invention will be better understood by virtue of the following examples, which are not restrictive in any respect.

EXAMPLE 1

This example relates to the selection of the molecular weight (expressed by the viscosity index) of the dispersing agent allowing the putting into aqueous suspension of natural calcium carbonate ground with no dispersant at a granulometry of which 73% of the particles have a diameter less than one micrometer determined by the Micromeritics company Sedigraph 5100 measurement and issuing from a mechanical reconcentration of the centrifugation type following upon this wet grinding at low concentration in terms of dry matter and with no dispersant.

This natural calcium carbonate is a marble.

For each test, the aqueous suspension of marble was prepared by introduction, into the filter cake issuing from the centrifugation, of 0.4% by dry weight of dispersing agent to be tested with respect to the dry weight of said filter cake to be put into suspension so as to obtain an aqueous suspension of calcium carbonate at a concentration in terms of dry matter equal to 61%.

After twenty minutes' agitation, a sample of the calcium carbonate suspension obtained is retrieved in a flask and its Brookfield viscosity is measured by means of an RVT type Brookfield viscometer, at a temperature of 25° C. and a speed of rotation of 100 rpm with the appropriate spindle.

After a time of 8 days in the flask, the Brookfield viscosity of the suspension is measured by introduction, into the non-agitated flask, of the appropriate spindle of the RVT type Brookfield viscometer, at a temperature of 25° C. and a speed of rotation of 10 rpm (PRE-AG viscosity= Brookfield viscosity before agitation).

The different homopolymers tested are:

Test 1

This test, which illustrates the prior art, uses a totally neutralized sodium polyacrylate with viscosity index equal to 0.04 measured according to the aforementioned procedure.

Test 2

This test, which illustrates the prior art, uses a mixed polyacrylate of magnesium and sodium (50% magnesium-50% sodium by mole) whose salified with soda form has a viscosity index equal to 0.04 measured according to the aforementioned procedure.

Test 3

This test, which illustrates the prior art, uses a totally neutralized sodium polyacrylate with viscosity index equal to 0.07 measured according to the aforementioned procedure.

Test 4

This test, which illustrates the invention, uses a totally neutralized sodium polyacrylate with viscosity index equal to 0.10 measured according to the aforementioned procedure.

Test 5

This test, which illustrates the invention, uses a totally neutralized sodium polyacrylate with viscosity index equal to 0.31 measured according to the aforementioned procedure.

Test 6

This test, which illustrates the invention, uses a totally neutralized sodium polyacrylate with viscosity index equal to 0.39 measured according to the aforementioned procedure.

Test 7

This test, which illustrates the invention, uses a totally neutralized sodium polyacrylate with viscosity index equal to 0.44 measured according to the aforementioned procedure.

Test 8

This test, which illustrates the invention, uses a totally neutralized sodium polyacrylate with viscosity index equal to 0.75 measured according to the aforementioned procedure.

Test 9

This test, which illustrates a field outside the invention, uses a totally neutralized sodium polyacrylate with viscosity index equal to 0.83 measured according to the aforementioned procedure.

All the experimental results are recorded in the following Table 1.

TABLE 1

| Tests | | Viscosity index | Composition (%) | Dose (%) | Brookfield viscosity T = 0 100 rpm (mPa · s) | Brookfield viscosity T = 8D PRE-AG 10 rpm (mPa · s) |
|---|---|---|---|---|---|---|
| 1 | Prior art | 0.04 | AA 100 | 0.4 | 6000 | 34000 |
| 2 | Prior art | 0.04 | AA 100 | 0.4 | 3500 | 32000 |
| 3 | Prior art | 0.07 | AA 100 | 0.4 | 2600 | 27000 |
| 4 | Invention | 0.10 | AA 100 | 0.4 | 1800 | 19000 |
| 5 | Invention | 0.31 | AA 100 | 0.4 | 880 | 9000 |
| 6 | Invention | 0.39 | AA 100 | 0.4 | 280 | 6000 |
| 7 | Invention | 0.44 | AA 100 | 0.4 | 320 | 7000 |
| 8 | Invention | 0.75 | AA 100 | 0.4 | 350 | 12000 |
| 9 | Outside the invention | 0.83 | AA 100 | 0.4 | 440 | 21000 |

AA: Acrylic acid
T = 0 means initial Brookfield viscosity of the suspension
T = 8D PRE-AG means Brookfield viscosity after 8 days' storage without agitation The reading of Table 1 allows it to be noted that, contrary to any expectation of persons skilled in the art, the homopolymers of acrylic acid having a viscosity index selected from the interval between 0.08 and 0.80 make it possible to put into suspension a calcium carbonate issuing from a mechanical reconcentration of the centrifugation type following upon a wet grinding at low concentration in terms of dry matter and with no dispersant.

EXAMPLE 2

This example relates to the use of copolymers according to the invention as dispersing agents allowing the putting into aqueous suspension of natural calcium carbonate ground with no dispersant at a granulometry of which 73% of the particles have a diameter less than one micrometer determined by the Micromeritics company Sedigraph 5100 measurement and issuing from a mechanical reconcentration of the centrifugation type following upon this wet grinding at low concentration in terms of dry matter and with no dispersant.

This natural calcium carbonate is a marble.

The dispersing agents of the different tests of the example are tested with the same equipment and the same operating method as in the previous example.

Test 10

This test, which illustrates a field outside the invention, uses a copolymer, 100% neutralized with soda, with viscosity index equal to 0.05 measured according to the aforementioned procedure and composed, in terms of weight percentage, of 70% acrylic acid and 30% methacrylic acid.

Test 11

This test, which illustrates the invention, uses a copolymer, 100% neutralized with soda, with viscosity index equal to 0.12 measured according to the aforementioned procedure and composed, in terms of weight percentage, of 70% acrylic acid and 30% methacrylic acid.

Test 12

This test, which illustrates the invention, uses a copolymer, 100% neutralized with soda, with viscosity index equal to 0.73 measured according to the aforementioned procedure and composed, in terms of weight percentage, of 70% acrylic acid and 30% methacrylic acid.

Test 13

This test, which illustrates a field outside the invention, uses a copolymer, 100% neutralized with soda, with viscosity index equal to 0.06 measured according to the aforementioned procedure and composed, in terms of weight percentage, of 80% acrylic acid and 20% ethylene glycol methacrylate phosphate.

Test 14

This test, which illustrates the invention, uses a copolymer, 100% neutralized with soda, with viscosity index equal to 0.08 measured according to the aforementioned procedure and composed, in terms of weight percentage, of 80% acrylic acid and 20% ethylene glycol methacrylate phosphate.

Test 15

This test, which illustrates the invention, uses a copolymer, 100% neutralized with soda, with viscosity index equal to 0.11 measured according to the aforementioned procedure and composed, in terms of weight percentage, of 80% acrylic acid and 20% ethylene glycol methacrylate phosphate.

Test 16

This test, which illustrates the invention, uses a copolymer, 100% neutralized with soda, with viscosity index equal to 0.17 measured according to the aforementioned procedure and composed, in terms of weight percentage, of 80% acrylic acid and 20% ethylene glycol methacrylate phosphate.

Test 17

This test, which illustrates the invention, uses a copolymer, 100% neutralized with soda, with viscosity index equal to 0.26 measured according to the aforementioned procedure and composed, in terms of weight percentage, of 80% acrylic acid and 20% ethylene glycol methacrylate phosphate.

Test 18

This test, which illustrates a field outside the invention, uses a copolymer, 100% neutralized with soda, with viscosity index equal to 0.81 measured according to the aforementioned procedure and composed, in terms of weight percentage, of 80% acrylic acid and 20% ethylene glycol methacrylate phosphate.

Test 19

This test, which illustrates a field outside the invention, uses a copolymer, 100% neutralized with soda, with viscosity index equal to 0.06 measured according to the aforementioned procedure and composed, in terms of weight percentage, of 70% acrylic acid and 30% acrylamido methyl propane sulphonic acid.

Test 20

This test, which illustrates the invention, uses a copolymer, 100% neutralized with soda, with viscosity index equal to 0.10 measured according to the aforementioned procedure and composed, in terms of weight percentage, of 70% acrylic acid and 30% acrylamido methyl propane sulphonic acid.

Test 21

This test, which illustrates the invention, uses a copolymer, 100% neutralized with soda, with viscosity index equal to 0.14 measured according to the aforementioned procedure and composed, in terms of weight percentage, of 70% acrylic acid and 30% acrylamido methyl propane sulphonic acid.

Test 22

This test, which illustrates the invention, uses a copolymer, 100% neutralized with soda, with viscosity index equal to 0.35 measured according to the aforementioned procedure and composed, in terms of weight percentage, of 70% acrylic acid and 30% acrylamido methyl propane sulphonic acid.

Test 23

This test, which illustrates the invention, uses a copolymer, 100% neutralized with soda, with viscosity index equal to 0.48 measured according to the aforementioned procedure and composed, in terms of weight percentage, of 70% acrylic acid and 30% acrylamido methyl propane sulphonic acid.

Test 24

This test, which illustrates the invention, uses a copolymer, 100% neutralized with soda, with viscosity index equal to 0.54 measured according to the aforementioned procedure and composed, in terms of weight percentage, of 70% acrylic acid and 30% acrylamido methyl propane sulphonic acid.

Test 25

This test, which illustrates a field outside the invention, uses a copolymer, 100% neutralized with soda, with viscosity index equal to 0.07 measured according to the aforementioned procedure and composed, in terms of weight percentage, of 30% acrylic acid and 70% acrylamide.

Test 26

This test, which illustrates the invention, uses a copolymer, 100% neutralized with soda, with viscosity index equal to 0.15 measured according to the aforementioned procedure and composed, in terms of weight percentage, of 30% acrylic acid and 70% acrylamide.

Test 27

This test, which illustrates the invention, uses a copolymer, 100% neutralized with soda, with viscosity index equal to 0.43 measured according to the aforementioned procedure and composed, in terms of weight percentage, of 30% acrylic acid and 70% acrylamide.

Test 28

This test, which illustrates the invention, uses a copolymer, 100% neutralized with soda, with viscosity index equal to 0.56 measured according to the aforementioned procedure and composed, in terms of weight percentage, of 30% acrylic acid and 70% acrylamide.

Test 29

This test, which illustrates the invention, uses a copolymer, 100% neutralized with soda, with viscosity index equal to 0.67 measured according to the aforementioned procedure and composed, in terms of weight percentage, of 30% acrylic acid and 70% acrylamide.

Test 30

This test, which illustrates the invention, uses a copolymer, 100% neutralized with soda, with viscosity index equal to 0.33 measured according to the aforementioned procedure and composed, in terms of weight percentage, of 70% acrylic acid and 30% methacrylamide.

Test 31

This test, which illustrates the invention, uses a copolymer, 100% neutralized with soda, with viscosity index equal to 0.28 measured according to the aforementioned procedure and composed, in terms of weight percentage, of 70% acrylic acid and 30% styrene sodium sulphonate.

Test 32

This test, which illustrates the invention, uses a copolymer, 100% neutralized with soda, with viscosity index equal to 0.48 measured according to the aforementioned procedure and composed, in terms of weight percentage, of 80% acrylic acid and 20% vinylpyrrolidone.

All the experimental results are recorded in the following Table 2.

determined by the Micromeritics company Sedigraph 5100 measurement and issuing from a mechanical reconcentration of the centrifugation type following upon this wet grinding at low concentration in terms of dry matter and with no dispersant.

This natural calcium carbonate is a chalk.

The dispersing agents of the different tests of the example are tested with the same equipment and the same operating method as in the previous example, with the exception of the dry matter content of the aqueous suspension of calcium carbonate obtained which is 62% instead of 61%, and the exception of the test 39, where 1.0% by dry weight of dispersing agent is tested.

Test 33

This test, which illustrates the invention, uses a copolymer, 100% neutralized with soda, with viscosity

TABLE 2

| Tests | | Viscosity index | Composition (%) | | | | Dose (%) | Brookfield viscosity T = 0 100 rpm (mPa · s) | Brookfield viscosity T = 8D PRE-AG 10 rpm (mPa · s) |
|---|---|---|---|---|---|---|---|---|---|
| 10 | Outside the invention | 0.05 | AA | 70 | MAA | 30 | 0.4 | 2300 | 19000 |
| 11 | Invention | 0.12 | AA | 70 | MAA | 30 | 0.4 | 1260 | 15000 |
| 12 | Invention | 0.73 | AA | 70 | MAA | 30 | 0.4 | 600 | 9000 |
| 13 | Outside the invention | 0.06 | AA | 80 | EGMAPO$_4$ | 20 | 0.4 | 1200 | 22000 |
| 14 | Invention | 0.08 | AA | 80 | EGMAPO$_4$ | 20 | 0.4 | 730 | 8000 |
| 15 | Invention | 0.11 | AA | 80 | EGMAPO$_4$ | 20 | 0.4 | 600 | 7000 |
| 16 | Invention | 0.17 | AA | 80 | EGMAPO$_4$ | 20 | 0.4 | 420 | 9000 |
| 17 | Invention | 0.26 | AA | 80 | EGMAPO$_4$ | 20 | 0.4 | 450 | 8000 |
| 18 | Outside the invention | 0.81 | AA | 80 | EGMAPO$_4$ | 20 | 0.4 | 550 | 33000 |
| 19 | Outside the invention | 0.06 | AA | 70 | AMPS | 30 | 0.4 | 1150 | 22000 |
| 20 | Invention | 0.10 | AA | 70 | AMPS | 30 | 0.4 | 850 | 9000 |
| 21 | Invention | 0.14 | AA | 70 | AMPS | 30 | 0.4 | 670 | 9000 |
| 22 | Invention | 0.35 | AA | 70 | AMPS | 30 | 0.4 | 540 | 5000 |
| 23 | Invention | 0.48 | AA | 70 | AMPS | 30 | 0.4 | 520 | 10000 |
| 24 | Invention | 0.54 | AA | 70 | AMPS | 30 | 0.4 | 700 | 16000 |
| 25 | Outside the invention | 0.07 | AAM | 70 | AA | 30 | 0.4 | Dispersion impossible | |
| 26 | Invention | 0.15 | AAM | 70 | AA | 30 | 0.4 | 1440 | 11000 |
| 27 | Invention | 0.43 | AAM | 70 | AA | 30 | 0.4 | 868 | 10450 |
| 28 | Invention | 0.56 | AAM | 70 | AA | 30 | 0.4 | 780 | 10000 |
| 29 | Invention | 0.67 | AAM | 70 | AA | 30 | 0.4 | 800 | 12000 |
| 30 | Invention | 0.33 | AA | 70 | MAAM | 30 | 0.4 | 550 | 11000 |
| 31 | Invention | 0.28 | AA | 70 | SSNa | 30 | 0.4 | 700 | 10500 |
| 32 | Invention | 0.48 | AA | 80 | VP | 20 | 0.4 | 900 | 11000 |

AA: Acrylic acid
AAM: Acrylamide
MAA: Methacrylic acid
AMPS: 2-acrylamido-2-methyl propane sulphonic acid
EGMAPO$_4$: Ethylene glycol methacrylate phosphate
MAAM: Methacrylamide
SSNa: Styrene sodium sulphonate
VP: Vinylpyrrolidone
T = 0 means initial Brookfield viscosity of the suspension
T = 8D PRE-AG means Brookfield viscosity after 8 days' storage without agitation The reading of Table 2 allows it to be noted that the copolymers of acrylic acid having a viscosity index selected from the interval between 0.08 and 0.80 make it possible to put into suspension a calcium carbonate issuing from a mechanical reconcentration of the centrifugation type following upon a wet grinding at low concentration in terms of dry matter and with no dispersant.

EXAMPLE 3

This example relates to the use of copolymers according to the invention as dispersing agents allowing the putting into aqueous suspension of natural calcium carbonate ground with no dispersant at a granulometry of which 61% of the particles have a diameter less than one micrometer index equal to 0.15 measured according to the aforementioned procedure and composed, in terms of weight percentage, of 80% acrylic acid and 20% itaconic acid.

Test 34

This test, which illustrates the invention, uses a copolymer, 100% neutralized with soda, with viscosity index equal to 0.73 measured according to the aforementioned procedure and composed, in terms of weight percentage, of 70% acrylic acid and 30% ethyl acrylate.

Test 35

This test, which illustrates the invention, uses a copolymer, 100% neutralized with soda, with viscosity index equal to 0.21 measured according to the aforementioned procedure and composed, in terms of weight percentage, of 70% acrylic acid and 30% methacrylic acid.Test 36

This test, which illustrates the invention, uses a copolymer, 100% neutralized with soda, with viscosity index equal to 0.42 measured according to the aforementioned procedure and composed, in terms of weight percentage, of 70% acrylic acid and 30% methacrylic acid.

index equal to 0.22 measured according to the aforementioned procedure and composed, in terms of weight percentage, of 85% acrylic acid and 15% methyl methacrylate.

All the experimental results are recorded in the following Table 3.

TABLE 3

| Tests | | Viscosity index | Composition (%) | | | | | Dose (%) | Brookfield viscosity T = 0 100 rpm (mPa · s) | Brookfield viscosity T = 8D PRE-AG 10 rpm (mPa · s) |
|---|---|---|---|---|---|---|---|---|---|---|
| 33 | Invention | 0.15 | AA | 80 | ITCA | 20 | | 0.4 | 225 | 7000 |
| 34 | Invention | 0.73 | AA | 70 | EA | 30 | | 0.4 | 960 | 16000 |
| 35 | Invention | 0.21 | AA | 70 | MAA | 30 | | 0.4 | 1100 | 12000 |
| 36 | Invention | 0.42 | AA | 70 | MAA | 30 | | 0.4 | 850 | 13500 |
| 37 | Invention | 0.70 | AA | 70 | MAA | 30 | | 0.4 | 655 | 10000 |
| 38 | Invention | 0.11 | AA | 80 | ALLYL | 20 | | 0.4 | 655 | 10000 |
| 39 | Invention | 0.10 | AA | 15 | MAA STY | 60 12.5 | | 1.0 | 800 | 10000 |
| 40 | Invention | 0.54 | AA | 90 | VAC BUA | 10 12.5 | | 0.4 | 600 | 13000 |
| 41 | Invention | 0.22 | AA | 85 | MMA | 15 | | 0.4 | 1250 | 15000 |

AA: Acrylic acid
MAA: Methacrylic acid
EA: Ethyl acrylate
ITCA: Itaconic acid
ALLYL: Allylamine
STY: Styrene
BUA: Butyl acrylate
VAC: Vinyl acetate
MMA: Methyl methacrylate
T = 0 means initial Brookfield viscosity of the suspension
T = 8D PRE-AG means Brookfield viscosity after 8 days' storage without agitation Test 37

This test, which illustrates the invention, uses a copolymer, 100% neutralized with soda, with viscosity index equal to 0.70 measured according to the aforementioned procedure and composed, in terms of weight percentage, of 70% acrylic acid and 30% methacrylic acid.

Test 38

This test, which illustrates the invention, uses a copolymer, 100% neutralized with soda, with viscosity index equal to 0.11 measured according to the aforementioned procedure and composed, in terms of weight percentage, of 80% acrylic acid and 20% allylamine.

Test 39

This test, which illustrates the invention, uses a copolymer, 100% neutralized with soda, with viscosity index equal to 0.10 measured according to the aforementioned procedure and composed, in terms of weight percentage, of 15% acrylic acid, 60% methacrylic acid, 12.5% styrene and 12.5% butyl acrylate.

Test 40

This test, which illustrates the invention, uses a copolymer, 100% neutralized with soda, with viscosity index equal to 0.54 measured according to the aforementioned procedure and composed, in terms of weight percentage, of 90% acrylic acid and 10% vinyl acetate.

Test 41

This test, which illustrates the invention, uses a copolymer, 100% neutralized with soda, with viscosity The reading of Table 3 allows it to be noted that the copolymers of acrylic acid having a viscosity index selected from the interval between 0.08 and 0.80 make it possible to put into suspension a calcium carbonate issuing from a mechanical reconcentration of the centrifugation type following upon a wet grinding at low concentration in terms of dry matter and with no dispersant, and with granulometry different from that of Example 2.

EXAMPLE 4

This example relates to the proportion of polymer used as a dispersing agent allowing the putting into aqueous suspension of natural calcium carbonate ground with no dispersant at a granulometry of which 61% of the particles have a diameter less than one micrometer determined by the Micromeritics company Sedigraph 5100 measurement and issuing from a mechanical reconcentration of the centrifugation type following upon this wet grinding at low concentration in terms of dry matter and with no dispersant.

This natural calcium carbonate is a marble.

For this test (test 42), the aqueous suspension of marble was prepared by introduction, into the filter cake issuing from the centrifugation, of 2.0% by dry weight, with respect to the dry weight of said filter cake to be put into suspension, of a copolymer 100% neutralized with soda with viscosity index equal to 0.13 measured according to the aforementioned procedure and composed, in terms of weight percentage, of 41% styrene, 15% butyl acrylate, 36% methacrylic acid and 8% acrylic acid, so as to obtain an aqueous suspension of calcium carbonate at a concentration in terms of dry matter equal to 62%.

After 20 minutes' agitation, a sample of the calcium carbonate suspension obtained is retrieved in a flask and its Brookfield viscosity is measured by means of an RVT type Brookfield viscometer, at a temperature of 25° C. and a speed of rotation of 100 rpm with the appropriate spindle.

The following result is obtained: Brookfield viscosity equal to 1550 mPa.s.

After a time of 8 days in the flask, the Brookfield viscosity of the suspension is measured by introduction, into the non-agitated flask, of the appropriate spindle of the RVT type Brookfield viscometer, at a temperature of 25° C. and a speed of rotation of 10 rpm with the appropriate spindle (PRE-AG viscosity=Brookfield viscosity before agitation).

The following result is obtained: Brookfield viscosity equal to 3000 mPa.s.

EXAMPLE 5

This example relates to the degree of neutralization and the nature of the neutralization of the polymer used as a dispersing agent allowing the putting into aqueous suspension of natural calcium carbonate ground with no dispersant at a granulometry of which 73% of the particles have a diameter less than one micrometer determined by the Micromeritics company Sedigraph 5100 measurement and issuing from a mechanical reconcentration of the centrifugation type following upon this wet grinding at low concentration in terms of dry matter and with no dispersant.

This natural calcium carbonate is a marble.

For each test, the aqueous suspension of marble was prepared by introduction, into the filter cake issuing from the The different homopolymers of acrylic acid tested are:

Test 43

This test, which illustrates the invention, uses a mixed polyacrylate of calcium and sodium (15% calcium-85% sodium by mole), the salified with soda form of which has a viscosity index equal to 0.39 measured according to the aforementioned procedure.

Test 44

This test, which illustrates the invention, uses a mixed polyacrylate of magnesium and sodium (15% magnesium—85% sodium by mole), the salified with soda form of which has a viscosity index equal to 0.39 measured according to the aforementioned procedure.

Test 45

This test, which illustrates the invention, uses a polyacrylate partially neutralized with soda (80% molar) with viscosity index equal to 0.39 measured according to the aforementioned procedure.

Test 46

This test, which illustrates the invention, uses a partially neutralized mixed polyacrylate of calcium and sodium (15% calcium-65% sodium by mole), the salified with soda form of which has a viscosity index equal to 0.39 measured according to the aforementioned procedure.

Test 47

This test, which illustrates the invention, uses a partially neutralized mixed polyacrylate of magnesium and sodium (15% magnesium-65% sodium by mole), the salified with soda form of which has a viscosity index equal to 0.39 measured according to the aforementioned procedure.

All the experimental results are recorded in the following Table 4.

TABLE 4

| Tests | Neutralization | | | | | Dose (%) | Brookfield viscosity T = 0 100 rpm (mPa · s) | Brookfield viscosity T = 8D PRE-AG 10 rpm (mPa · s) |
|---|---|---|---|---|---|---|---|---|
| 43 | Invention | 85% | Na | 15% | Ca | 0.8 | 840 | 8000 |
| 44 | Invention | 85% | Na | 15% | Mg | 0.8 | 870 | 10000 |
| 45 | Invention | 80% | Na | — | | 0.8 | 1020 | 7000 |
| 46 | Invention | 65% | Na | 15% | Ca | 0.8 | 920 | 5000 |
| 47 | Invention | 65% | Na | 15% | Mg | 0.8 | 1550 | 6000 |

T = 0 means initial Brookfield viscosity of the suspension
T = 8D PRE-AG means Brookfield viscosity after 8 days' storage without agitation centrifugation, of 0.8% by dry weight of dispersing agent to be tested with respect to the dry weight of said filter cake to be put into suspension so as to obtain an aqueous suspension of calcium carbonate at a concentration in terms of dry matter equal to 63%.

After 20 minutes' agitation, a sample of the calcium carbonate suspension obtained is retrieved in a flask and its Brookfield viscosity is measured by means of an RVT type Brookfield viscometer, at a temperature of 25° C. and a speed of rotation of 100 rpm with the appropriate spindle.

After a time of 8 days in the flask, the Brookfield viscosity of the suspension is measured by introduction, into the non-agitated flask, of the appropriate spindle of the RVT type Brookfield viscometer, at a temperature of 25° C. and a speed of rotation of 10 rpm (PRE-AG viscosity=Brookfield viscosity before agitation).

The reading of Table 4 allows it to be noted that the homopolymers of acrylic acid having a viscosity index selected from the interval between 0.08 and 0.80, whether partially or totally neutralized by at least one neutralizing agent having a monovalent function and possibly by an agent having a polyvalent function, make it possible to put into suspension a calcium carbonate issuing from a mechanical reconcentration of the centrifugation type following upon a wet grinding at low concentration in terms of dry matter and with no dispersant.

EXAMPLE 6

This example relates to the nature of the neutralizing agent, having a monovalent function, of the polymer used as a dispersing agent allowing the putting into aqueous suspension of natural calcium carbonate ground with no dispersant at a granulometry of which 73% of the particles have a diameter less than one micrometer determined by the Micromeritics company Sedigraph 5100 measurement and issuing from a mechanical reconcentration of the filter press type following upon this wet grinding at low concentration in terms of dry matter and with no dispersant.

This natural calcium carbonate is a marble.

For each test, the aqueous suspension of marble was prepared by introduction, into the filter cake issuing from the filtration, of 0.4% by dry weight of dispersing agent to be tested with respect to the dry weight of said filter cake to be put into suspension so as to obtain an aqueous suspension of calcium carbonate at a concentration in terms of dry matter equal to 63%.

After 20 minutes' agitation, a sample of the calcium carbonate suspension obtained is retrieved in a flask and its Brookfield viscosity is measured by means of an RVT type Brookfield viscometer, at a temperature of 25° C. and a speed of rotation of 100 rpm with the appropriate spindle.

After a time of 8 days in the flask, the Brookfield viscosity of the suspension is measured by introduction, into the non-agitated flask, of the appropriate spindle of the RVT type Brookfield viscometer, at a temperature of 25° C. and a speed of rotation of 10 rpm (PRE-AG viscosity= Brookfield viscosity before agitation).

The different homopolymers of acrylic acid tested are:

Test 48

This test, which illustrates the invention, uses a totally neutralized potassium polyacrylate, the salified with soda form of which has a viscosity index equal to 0.39 measured according to the aforementioned procedure.

Test 49

This test, which illustrates the invention, uses a totally neutralized lithium polyacrylate, the salified with soda form of which has a viscosity index equal to 0.39 measured according to the aforementioned procedure.

Test 50

This test, which illustrates the invention, uses a totally neutralized ammonium polyacrylate, the salified with soda form of which has a viscosity index equal to 0.39 measured according to the aforementioned procedure.

All the experimental results are recorded in the following Table 5.

TABLE 5

| Tests | Neutralization | | Dose (%) | Brookfield viscosity T = 0 100 rpm (mPa · s) | Brookfield viscosity T = 8D PRE-AG 10 rpm (mPa · s) |
|---|---|---|---|---|---|
| 48 | Invention | 100% KOH | 0.4 | 130 | 8000 |
| 49 | Invention | 100% LiOH | 0.4 | 180 | 3500 |
| 50 | Invention | 100% NH$_4$OH | 0.4 | 120 | 6000 |

T = 0 means initial Brookfield viscosity of the suspension
T = 8D PRE-AG means Brookfield viscosity after 8 days' storage without agitation The reading of Table 5 allows it to be noted that the homopolymers of acrylic acid having a viscosity index selected from the interval between 0.08 and 0.80 make it possible to put into suspension a calcium carbonate issuing from a mechanical reconcentration of the filter press type following upon a wet grinding at low concentration in terms of dry matter and with no dispersant, whatever the nature of the neutralizing agent having a monovalent function.

EXAMPLE 7

This example relates to the use of polymers according to the invention as dispersing agents allowing the putting into aqueous suspension of natural calcium carbonate ground with no dispersant at a granulometry of which 73% of the particles have a diameter less than one micrometer determined by the Micromeritics company Sedigraph 5100 measurement and issuing from a thermal reconcentration following upon this wet grinding at low concentration in terms of dry matter and with no dispersant.

This natural calcium carbonate is a marble.

For this test (test 51), the aqueous suspension of marble was prepared by introduction, into the thermally reconcentrated suspension, of 1.0% by dry weight, with respect to the dry weight of said filter cake to be put into suspension, of a totally neutralized sodium polyacrylate with viscosity index equal to 0.39 measured according to the aforementioned procedure, so as to obtain an aqueous suspension of calcium carbonate at a concentration in terms of dry matter equal to 72%.

After 20 minutes' agitation, a sample of the calcium carbonate suspension obtained is retrieved in a flask and its Brookfield viscosity is measured by means of an RVT type Brookfield viscometer, at a temperature of 25° C. and a speed of rotation of 100 rpm with the appropriate spindle.

The following result is obtained: Brookfield viscosity equal to 700 mPa.s.

After a time of 8 days in the flask, the Brookfield viscosity of the suspension is measured by introduction, into the non-agitated flask, of the appropriate spindle of the RVT type Brookfield viscometer, at a temperature of 25° C. and a speed of rotation of 10 rpm with the appropriate spindle (PRE-AG viscosity=Brookfield viscosity before agitation).

The following result is obtained: Brookfield viscosity equal to 11,000 mPa.s.

This result allows it to be noted that the polymers of acrylic acid having a viscosity index selected from the interval between 0.08 and 0.80 make it possible to put into suspension, highly concentrated in terms of dry matter, a calcium carbonate issuing from a thermal reconcentration following upon a wet grinding at low concentration in terms of dry matter and with no dispersant.

EXAMPLE 8

This example relates to the use of polymers according to the invention as dispersing agents allowing the putting into aqueous suspension of natural calcium carbonate ground with no dispersant at a granulometry of which 73% of the particles have a diameter less than one micrometer determined by the Micromeritics company Sedigraph 5100 measurement and issuing from a mechanical reconcentration of the centrifugation type followed by a thermal reconcentration following upon this wet grinding at low concentration in terms of dry matter and with no dispersant.

This natural calcium carbonate is a marble.

For this test (test 52), the aqueous suspension of marble was prepared by introduction, into the filter cake issuing from the mechanical and then thermal reconcentration, of 0.8% by dry weight, with respect to the dry weight of said filter cake to be put into suspension, of a copolymer totally neutralized with soda, with viscosity index equal to 0.15 and composed of 80% by weight of acrylic acid and 20% by weight of itaconic acid, so as to obtain an aqueous suspension of calcium carbonate at a concentration in terms of dry matter equal to 72%.

After 20 minutes' agitation, a sample of the calcium carbonate suspension obtained is retrieved in a flask and its Brookfield viscosity is measured by means of an RVT type Brookfield viscometer, at a temperature of 25° C. and a speed of rotation of 100 rpm with the appropriate spindle.

The following result is obtained: Brookfield viscosity (100 rpm)=390 mPa.s.

After a time of 8 days in the flask, the Brookfield viscosity of the suspension is measured by introduction, into the non-agitated flask, of the appropriate spindle of the RVT type Brookfield viscometer, at a temperature of 25° C. and a speed of rotation of 10 rpm (PRE-AG viscosity= Brookfield viscosity before agitation).

The following result is obtained: Brookfield viscosity (10 rpm)=4,000 mPa.s.

This result allows it to be noted that the acrylic acid/itaconic acid copolymer having a viscosity index selected from the interval between 0.08 and 0.80 makes it possible to put into suspension, highly concentrated in terms of dry matter, a calcium carbonate issuing from a mechanical and then thermal reconcentration following upon a wet grinding at low concentration in terms of dry matter and with no dispersant.

EXAMPLE 9

This example relates to the use of aqueous suspensions of mineral fillers as proposed by the invention in the manufacture of coating colour for paper.

To this end, the coating colours are prepared by mixing the aqueous suspensions of mineral fillers to be tested in water with the other constituents of the coating colour, the composition by weight of which is as follows:

100 parts of aqueous suspensions to be tested with a content of 65% in dry substance 12 parts of a carboxylated styrene-butadiene latex marketed by Dow Chemical under the name of DL 905

0.5 part of carboxymethyl cellulose sold by Metsa Serla under the name of Finnfix 5, the content of dry substance being in the order of 64.5% and the pH being equal to 8.4.

Brookfield viscosity measurements are then taken on the coating colours prepared in this manner, at ambient temperature and at 20 revolutions per minute, 50 revolutions per minute and 100 revolutions per minute using a Brookfield viscometer of the DVII type fitted with the appropriate spindle.

Test 53

This test, illustrating the invention, uses an aqueous suspension of calcium carbonate according to test n°6.

The results of all the experiments are set out in table 6 below.

TABLE 6

| | | Brookfield viscosity in mPa.s. | | |
|---|---|---|---|---|
| | Test n° | 20 r/min | 50 r/min | 100 r/min |
| Invention | 53 | 3650 | 2000 | 1590 |

Table 6 shows that an aqueous suspension of calcium carbonate according to the invention can be used in the manufacture of coating colour for paper.

EXAMPLE 10

This example relates to the use of aqueous suspensions of mineral fillers as proposed by the invention in the mass filling for paper. To this end, sheets of paper are made from a cellulose pulp of SR 23 degree containing a woodless sulphate paste and fibres comprising 80% birch and 20% pine. 45 g dry weight of this pulp are then diluted in 10 liters of water in the presence of about 15 g dry weight of the filler composition to be tested to produce experimentally a filler content of 20%. After 15 minutes of agitation and adding 0.06% by dry weight, relative to the dry weight of paper, a retention agent of the polyacrylamide type, a sheet is made with a grammage equal to 75 g/m$^2$ and filled to 20%. The device used to make the sheet is a Rapid-Köthen 20.12 MC modelby Haage.

The sheets prepared in this manner are dried for 400 seconds at 92° C. and in a vacuum of 940 mbar. The filler content is controlled by analysing the ashes.

The value for opacity of the obtained paper sheet is then determined using the DIN 53146 standard.

Test 54

This test, which illustrates the invention, uses the aqueous suspension of calcium carbonate according to test 6. The value for opacity, measured using the DIN 53146 standard, is 88.

This value shows that anyone of the aqueous suspension of calcium carbonate, according to the invention, can be used as a mass filling for paper.

EXAMPLE 11

This example relates to the use of aqueous suspensions of mineral fillers as proposed by the invention in the field of paint and more particularly water-based glazed paint. To do that, test 55 according to the invention is carried out.

For this test, the constituents of the said water-based glazed paint were added in succession, these being:

| | |
|---|---|
| 40 g | of monopropylene glycol |
| 2 g | of a biocide, marketed by TROY under the name of MERGAL ™ K6N |
| 1 g | of an anti-foaming agent marketed by HENKEL under the name of NOPCO ™ NDW |
| 217,4 g | of the calcium carbonate aqueous suspension according to test 6 and with a solid content of 65% |
| 200 g | of rutile titanium oxide marked by MILLENNIUM under the name TIONA ™ RL 68 |
| 450 g | of a styrene-acrylic binder in dispersion, marketed by RHODIA under the name of RHODOPAS ™ DS 910 |
| 30 g | of butyldiglycol |
| 1 g | of Nopco ™ NDW |

-continued

| | |
|---|---|
| 3 g | of 28% ammonia |
| 4 g | of a thickening agent marketed by COATEX under the name COATEX BR100P and |
| 49,6 g | of water. |

After agitating the aqueous composition made up in this way for a few minutes at a pH equal to 8.5 the Brookfield viscosities of the different compositions are measured at 25° C. and at 10 revolutions per minute and 100 revolutions per minute using a standard RVT Brookfield viscometer fitted with the requisite spindle.

The rheological stability of the formula over time and in terms of temperature is determined by measuring the Brookfield viscosities at 10 revolutions per minute and at 100 revolutions per minute at 25° C. of this same formula after storing at ambient temperature without agitation for 24 hours and then after storing for one week at ambient temperature.

The rheological stability is also determined by the ICI viscosity which is a high shear viscosity measured with the use of a plan cone viscometer.

The Stormer KU viscosity is also measured in Krebs Unit with the use of a Stormer viscometer.

The obtained results of the different measurements are:
At t=0
  Brookfield viscosity 10 rpm=4000 mPa.s
  Brookfield viscosity 100 rpm=2200 mPa.s
  ICI viscosity=160 mPa.s
  KU Stormer viscosity=97 KU
At t=24 hours
  Brookfield viscosity 10 rpm=8400 mpa.s
  Brookfield viscosity 100 rpm=4700 mPa.s
  ICI viscosity=130 mpa.s
  KU Stormer viscosity=121 KU
At t=8 days
  Brookfield viscosity 10 rpm=8200 mPa.s
  Brookfield viscosity 100 rpm=4600 mPa.s
  ICI viscosity=130 mPa.s
  KU Stormer viscosity=121 KU The reading of these results shows that anyone of the aqueous suspension of calcium carbonate, according to the invention, can be used in the field of paint.

What is claimed is:

1. A dispersing agent for an aqueous suspension of mineral particles, said dispersing agent comprising a homopolymer of acrylic acid, a water-soluble copolymer of acrylic acid with one or more acrylic, vinyl or allylic monomers, or both the homopolymer and the copolymer,
   wherein the homopolymer or copolymer has a molecular weight corresponding to a viscosity index with a value from 0.08 to 0.80, and wherein said mineral particles are derived from mechanical reconcentration, thermal reconcentration, or both mechanical and thermal reconcentration after wet grinding in the absence of a dispersant at low concentrations of dry matter.

2. The dispersing agent of claim 1, comprising a homopolymer of acrylic acid in a form partially neutralized or totally neutralized by one or more neutralizing agents having a monovalent function containing an alkaline cation, and optionally by one or more neutralizing agents having a polyvalent function containing an alkaline-earth divalent cation, or a compound containing a higher-valency cation.

3. The dispersing agent of claim 1, comprising a water-soluble copolymer of acrylic acid, wherein the one or more acrylic, vinyl or allylic monomers are chosen from the group consisting of methacrylic acid, itaconic acid, crotonic acid, fumaric acid, isocrotonic, aconitic, mesaconic, sinapic, undecylenic, angelic acid, canellic acid, acrylamido methyl propane sulphonic acid in acid form, acrylamido methyl propane sulphonic acid in partially neutralized form, acrylamide, methacrylamide, esters of acrylic acid, esters of methacrylic acids, vinylpyrrolidone, vinylcaprolactame, isobutylene, diisobutylene, vinyl acetate, styrene, alphamethylstyrene, styrene sodium sulphonate, vinylmethylether, allylamine and derivatives thereof.

4. The dispersing agent of claim 1, comprising a water-soluble copolymer of acrylic acid, wherein the one or more acrylic, vinyl or allylic monomers are partially neutralized or totally neutralized by one or more neutralizing agents having a monovalent function containing an alkaline cation, and optionally by one or more neutralizing agents having a polyvalent function containing an alkaline-earth divalent cation, or a compound containing a higher-valency cation.

5. The dispersing agent of claim 1, wherein the homopolymer, the water-soluble copolymer or both, have a molecular weight corresponding to a viscosity index with a value from 0.20 to 0.60.

6. A method of preparing an aqueous suspension of mineral particles, said process comprising
   mixing the dispersing agent of claim 1 with one or more mineral particles derived from mechanical reconcentration, thermal reconcentration, or both mechanical and thermal reconcentration after wet grinding in the absence of a dispersant.

7. The method of claim 6, wherein the dispersing agent is mixed in the proportion of 0.1% to 2% by dry weight with respect to the dry weight of the mineral particles.

8. An aqueous suspension comprising mineral particles, water and 0.1% to 2% by dry weight, with respect to the dry weight of the mineral particles, of the dispersing agent according to claim 1,
   wherein said mineral particles are derived from mechanical reconcentration, thermal reconcentration, or both mechanical and thermal reconcentration, after wet grinding in the absence of a dispersant and at low concentration of dry matter.

9. The aqueous suspension of mineral particles according to claim 8, wherein the mineral particles are chosen from the group consisting of synthetic calcium carbonates, natural calcium carbonates, dolomites and mixtures thereof.

10. The aqueous suspension of mineral particles according to claim 8, wherein the suspension has a concentration, in terms of dry matter, of at least 60% with a Brookfield viscosity less than 2,000 mPa.s measured at 100 rpm immediately after formation of the suspension and a Brookfield viscosity less than 20,000 mPa.s, measured at 10 rpm after eight days storage without agitation.

11. The dispersing agent of claim 2, wherein the alkaline cation is at least one selected from the group consisting of sodium, potassium, lithium, ammonium, aliphatic primary amines, aliphatic secondary amines, cyclic primary amines, cyclic secondary amines, ethanolamines, monoethylamine, diethylamine, and cyclohexylamine.

12. The dispersing agent of claim 2, wherein the homopolymer is neutralized by at least one alkaline-earth divalent cation selected from the group consisting of magnesium, calcium, and zinc.

13. The dispersing agent of claim 2, wherein the homopolymer is neutralized by at least one neutralizing agent having a polyvalent function comprising a trivalent cation.

14. The dispersing agent of claim 13, wherein the trivalent cation is aluminum.

15. The dispersing agent of claim 3, wherein the one or more acrylic, vinyl or allylic monomers are selected from the group consisting of ethyl acrylate, butyl acrylate, methyl methacrylate, phosphate of acrylate of ethylene glycol, phosphate of acrylate of propylene glycol, phosphate of methacrylate of ethylene glycol and phosphate of methacrylate of propylene glycol.

16. The dispersing agent of claim 4, wherein the alkaline cation is at least one selected from the group consisting of sodium, potassium, lithium, ammonium, aliphatic primary amines, aliphatic secondary amines, cyclic primary amines, and cyclic secondary amines.

17. The dispersing agent of claim 4, wherein the alkaline cation is at least one selected from the group consisting of ethanolamine, monoethylamine, diethylamine, and cyclohexylamine.

18. The dispersing agent of claim 4, wherein the copolymer is neutralized by at least one alkaline-earth divalent cation selected from the group consisting of magnesium, calcium, and zinc.

19. The dispersing agent of claim 4, wherein the copolymer is neutralized by at least one neutralizing agent having a polyvalent function that is a trivalent cation.

20. The dispersing agent of claim 19, wherein the trivalent cation is aluminum.

21. The method of claim 7, wherein the composition is mixed in the proportion of 0.3% to 1% by dry weight.

22. The aqueous suspension of claim 8, comprising from 0.3% to 1% by weight of the dispersing agent.

23. The aqueous suspension of claim 9, wherein the mineral particles comprise a natural calcium carbonate selected from the group consisting of chalk, calcite, marble and mixtures thereof.

24. A filler for paper coating or filling comprising the suspension as claimed in claim 8.

25. A method comprising
coating or mass filling a substrate or a composition with the aqueous suspension of claim 8, wherein said substrate or composition is a paint, ceramic, drilling fluid, filler for synthetic resin, rubber, detergent, cleaning formulation, cement or plaster.

26. The dispersing agent of claim 1, comprising an acrylic copolymer comprising one or more polymerized units of a monomer selected from the group consisting of an acrylamido sulphonic acid, a phosphate acrylate of ethylene glycol, a phosphate acrylate of propylene glycol, a phosphate methacrylate of ethylene glycol, and a phosphate methacrylate of propylene glycol.

27. The method of claim 6, wherein the dispersing agent comprises an acrylic copolymer comprising one or more polymerized units of a monomer selected from the group consisting of an acrylamido sulphonic acid, a phosphate acrylate of ethylene glycol, a phosphate acrylate of propylene glycol, a phosphate methacrylate of ethylene glycol, and a phosphate methacrylate of propylene glycol.

28. The aqueous suspension of claim 1, wherein the dispersing agent comprises an acrylic copolymer comprising one or more polymerized units of a monomer selected from the group consisting of an acrylamido sulphonic acid, a phosphate acrylate of ethylene glycol, a phosphate acrylate of propylene glycol, a phosphate methacrylate of ethylene glycol, and a phosphate methacrylate of propylene glycol.

* * * * *